US010515760B1

(12) United States Patent
Park

(10) Patent No.: US 10,515,760 B1
(45) Date of Patent: Dec. 24, 2019

(54) MULTILAYER CERAMIC CAPACITOR WITH DIELECTRIC LAYERS INCLUDING DIELECTRIC GRAINS HAVING A CORE-SHELL STRUCTURE

(71) Applicant: SAMSUNG ELECTRO-MECHANICS CO., LTD., Suwon-si, Gyeonggi-do (KR)

(72) Inventor: Kum Jin Park, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/158,847

(22) Filed: Oct. 12, 2018

(30) Foreign Application Priority Data

Aug. 9, 2018 (KR) .................. 10-2018-0092877

(51) Int. Cl.
| | |
|---|---|
| *H01G 4/12* | (2006.01) |
| *H01G 4/30* | (2006.01) |
| *H01G 4/005* | (2006.01) |
| *C04B 35/49* | (2006.01) |
| *C04B 35/626* | (2006.01) |
| *C01G 23/00* | (2006.01) |

(52) U.S. Cl.
CPC ......... *H01G 4/1218* (2013.01); *C01G 23/006* (2013.01); *C04B 35/49* (2013.01); *C04B 35/62675* (2013.01); *C04B 35/62685* (2013.01); *H01G 4/005* (2013.01); *H01G 4/1245* (2013.01); *H01G 4/30* (2013.01); *C04B 2235/656* (2013.01)

(58) Field of Classification Search
CPC combination set(s) only.
See application file for complete search history.

(56) References Cited

U.S. PATENT DOCUMENTS

| | | | |
|---|---|---|---|
| 6,292,354 B1 * | 9/2001 | Kobayashi | C04B 35/4682 361/321.2 |
| 2006/0208575 A1 * | 9/2006 | Orimo | H01G 4/0085 307/109 |
| 2009/0215605 A1 * | 8/2009 | Letz | C03B 32/02 501/5 |
| 2011/0111947 A1 * | 5/2011 | Natsui | C01G 23/006 501/137 |
| 2011/0130268 A1 * | 6/2011 | Wang | C04B 35/4682 501/138 |

(Continued)

FOREIGN PATENT DOCUMENTS

| | | |
|---|---|---|
| JP | 2007-153636 A | 6/2007 |
| JP | 2011-256091 A | 12/2011 |

(Continued)

*Primary Examiner* — David M Sinclair
(74) *Attorney, Agent, or Firm* — Morgan, Lewis & Bockius LLP

(57) ABSTRACT

A multilayer ceramic capacitor includes: a ceramic body including dielectric layers and first and second internal electrodes disposed to face each other with each of the dielectric layers interposed therebetween; and first and second external electrodes disposed on external surfaces of the ceramic body and electrically connected to the first and second internal electrode, respectively, wherein the dielectric layer includes dielectric grains having a core-shell structure including a core and a shell, and a domain wall is disposed in the shell.

20 Claims, 4 Drawing Sheets

(56) References Cited

U.S. PATENT DOCUMENTS

2014/0313634 A1* 10/2014 Yoon .................. H01G 4/1227
                                                                             361/301.4
2016/0247635 A1    8/2016 Hirahara et al.
2018/0182549 A1* 6/2018 Koide .................. C04B 35/638

FOREIGN PATENT DOCUMENTS

| JP | 2013107812 A | * | 6/2013 |
| JP | 2017-092280 A | | 5/2017 |
| WO | 2015-056558 A1 | | 4/2015 |

\* cited by examiner

–RELATED ART–

MULTILAYER CERAMIC CAPACITOR WITH DIELECTRIC LAYERS INCLUDING DIELECTRIC GRAINS HAVING A CORE-SHELL STRUCTURE

CROSS-REFERENCE TO RELATED APPLICATION(S)

This application claims the benefit of priority to Korean Patent Application No. 10-2018-0092877 filed on Aug. 9, 2018 in the Korean Intellectual Property Office, the disclosure of which is incorporated herein by reference in its entirety.

TECHNICAL FIELD

The present disclosure relates to a multilayer ceramic capacitor capable of having improved reliability.

BACKGROUND

Generally, electronic components using a ceramic material, such as a capacitor, an inductor, a piezoelectric element, a varistor, a thermistor, and the like, include a ceramic body formed of the ceramic material, internal electrodes formed in the ceramic body, and external electrodes installed on surfaces of the ceramic body to be connected to the internal electrodes.

Recently, in accordance with miniaturization and multi-functionalization of electronic products, multilayer ceramic capacitors have also tended to be miniaturized and multi-functionalized. Therefore, a multilayer ceramic capacitor having a small size and high capacitance has been demanded.

As a method of simultaneously accomplishing miniaturization and an increase in capacitance of the multilayer ceramic capacitor, there is a method of increasing the numbers of dielectric layers and electrode layers stacked in the multilayer ceramic capacitor by decreasing thicknesses of the dielectric layers and the electrode layers. Currently, a thickness of the dielectric layer is about 0.6 µm, and technology for decreasing the thickness of the dielectric layer is being continuously developed.

In addition, in order to accomplish the increase in the capacitance of the multilayer ceramic capacitor, a material having a high dielectric constant has been demanded. Atypical material used in the multilayer ceramic capacitor is barium titanate ($BaTiO_3$), but it is difficult to develop a material for increasing a dielectric constant due to a limitation of inherent characteristics of the barium titanate.

Therefore, research into technology of implementing a high dielectric constant by doping additives on a surface of the barium titanate ($BaTiO_3$) or reforming the surface of the barium titanate ($BaTiO_3$) has been conducted, but there is no remarkable achievement.

Meanwhile, it has been known that there is an influence of a domain wall of 90° in a principle of implementing a dielectric constant. Therefore, research into technology for improving the tetragonality of barium titanate ($BaTiO_3$) has been continuously conducted.

A dielectric has a core-shell structure due to additives added to a dielectric material of the multilayer ceramic capacitor in order to improve reliability of the multilayer ceramic capacitor and secure sinterability of the multilayer ceramic capacitor, but the domain wall is not present in a shell, such that there is a limitation in implementing a high dielectric constant.

SUMMARY

An aspect of the present disclosure may provide a multilayer ceramic capacitor capable of having improved reliability.

According to an aspect of the present disclosure, a multilayer ceramic capacitor may include: a ceramic body including dielectric layers and first and second internal electrodes disposed to face each other with each of the dielectric layers interposed therebetween; and first and second external electrodes disposed on external surfaces of the ceramic body and electrically connected to the first and second internal electrode, respectively, wherein the dielectric layer includes dielectric grains having a core-shell structure including a core and a shell, and a domain wall is disposed in the shell.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
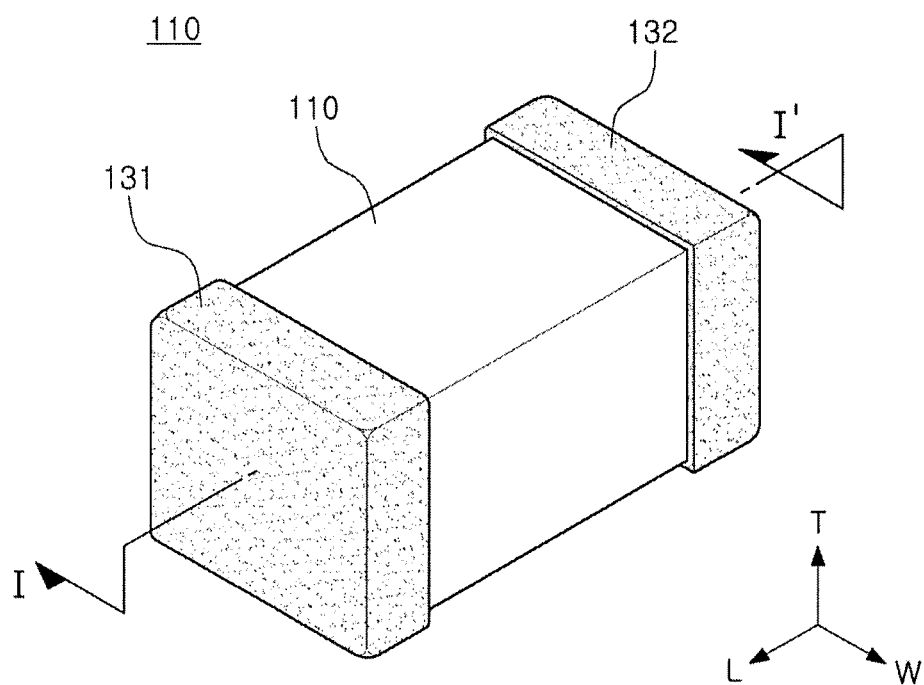
FIG. 1 is a schematic perspective view illustrating a multilayer ceramic capacitor according to an exemplary embodiment of the present disclosure.

FIG. 1 is a schematic perspective view illustrating a multilayer ceramic capacitor according to an exemplary embodiment of the present disclosure.

Figure 2:
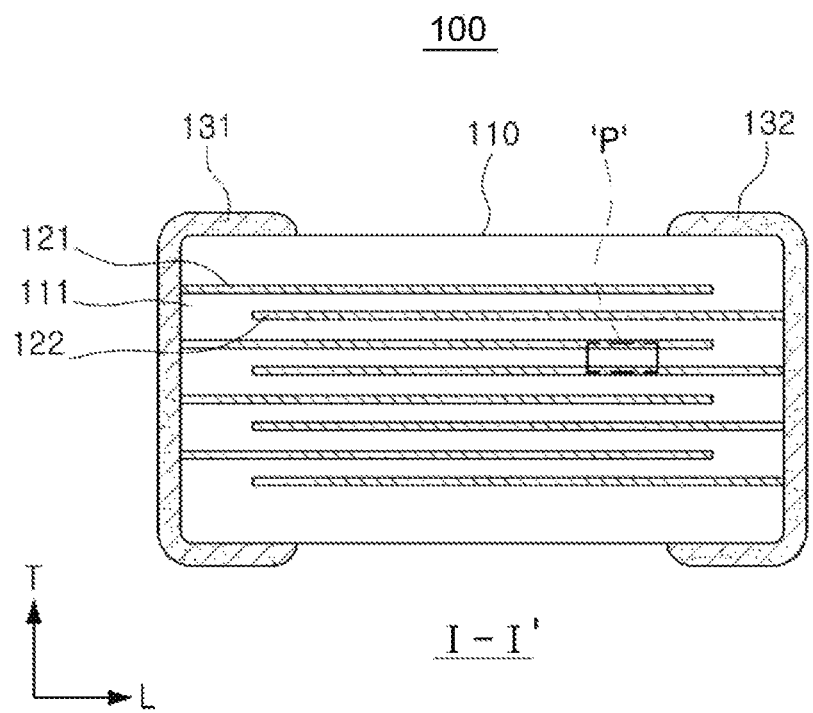
FIG. 2 is a cross-sectional view taken along line I-I' of FIG. 1.

FIG. 2 is a cross-sectional view taken along line I-I' of FIG. 1.

Referring to FIGS. 1 and 2, a multilayer ceramic capacitor 100 according to the present exemplary embodiment may include a ceramic body 110 including dielectric layers 111 and first and second internal electrodes 121 and 122 disposed to face each other with each of the dielectric layers 111 interposed therebetween, and first and second external electrodes 131 and 132 disposed on external surfaces of the ceramic body 110 and electrically connected to the first and second internal electrodes 121 and 122, respectively.

In the multilayer ceramic capacitor 100 according to an exemplary embodiment in the present disclosure, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' refers to a direction in which the dielectric layers 111 are stacked, that is, a 'stacked direction'.

A shape of the ceramic body 110 is not particularly limited, but may be a rectangular parallelepiped shape as illustrated.

One ends of a plurality of internal electrodes 121 and 122 formed in the ceramic body 110 may be exposed to one surface of the ceramic body 110 or the other surface of the ceramic body 110 opposing the one surface.

The internal electrodes 121 and 122 may have a pair of first and second internal electrodes 121 and 122 having different polarities.

One ends of the first internal electrodes 121 may be exposed to one surface of the ceramic body 110, and one ends of the second internal electrodes 122 may be exposed to the other surface of the ceramic body 110 opposing the one surface.

The first and second external electrodes 131 and 132 may be formed, respectively, on one surface of the ceramic body 110 and the other surface of the ceramic body 110 opposing the one surface, and may be electrically connected to the first and second internal electrodes 121 and 122.

A material of each of the first and second internal electrodes 121 and 122 is not particularly limited, but may be a conductive paste including one or more of silver (Ag), lead (Pb), platinum (Pt), nickel (Ni), and copper (Cu).

The first and second external electrodes 131 and 132 may be electrically connected to the first and second internal electrodes 121 and 122, respectively, in order to form capacitance, and the second external electrode 132 may be connected to a potential different to a potential to which the first external electrode 131 is connected.

A conductive material contained in each of the first and second external electrodes 131 and 132 is not particularly limited, but may be nickel (Ni), copper (Cu), or alloys thereof.

Thicknesses of the first and second external electrodes 131 and 132 may be appropriately determined depending on the purpose, or the like, and may be, for example, 10 μm to 50 μm, but are not particularly limited thereto.

According to an exemplary embodiment in the present disclosure, a raw material of the dielectric layer 111 is not particularly limited as long as a sufficient capacitance may be obtained. For example, the raw material of the dielectric layer 11 may be barium titanate (BaTiO$_3$) powder particles.

A material of the dielectric layer 111 may be prepared by adding various ceramic additives, organic solvents, plasticizers, binders, dispersing agents, and the like, to powder particles such as the barium titanate (BaTiO$_3$) powder particles, or the like, according to an object of the present disclosure.

The dielectric layers 111 may be in a sintered state, and adjacent dielectric layers may be integrated with each other so that boundaries therebetween are not readily apparent.

The first and second internal electrodes 121 and 122 may be formed on the dielectric layers 111, and the first and second internal electrodes 121 and 122 may be formed in the ceramic body 110 with each of the dielectric layers 111 interposed therebetween, by sintering.

The ceramic body 110 may include the active portion A contributing to forming capacitance of a capacitor, and the upper and lower cover portions C formed as upper and lower margin portions on the upper and lower surfaces of the active portion A, respectively.

The active portion A may be formed by repeatedly stacking a plurality of first and second internal electrodes 121 and 122 with each of the dielectric layers 111 interposed therebetween.

The upper and lower cover portions C may be formed of the same material as that of the dielectric layer 111 and have the same configuration as that of the dielectric layer ill except that they do not include internal electrodes.

That is, the upper and lower cover portions C may include a ceramic material such as a barium titanate (BaTiO$_3$)-based ceramic material.

The upper and lower cover portions C may be formed by stacking a single dielectric layer or two or more dielectric layers on the upper and lower surfaces of the active portion A, respectively, in a vertical direction, and may basically serve to prevent damage to the first and second internal electrodes 121 and 122 due to physical or chemical stress.

A thickness of each of the dielectric layers 111 may be arbitrarily changed depending on capacitance design of the multilayer ceramic capacitor, and in an exemplary embodiment in the present disclosure, a thickness of one dielectric layer 111 after sintering may be 0.4 μm or less.

In addition, a thickness of each of the first and second internal electrodes 121 and 122 after the sintering may be 0.4 μm or less.

Figure 3:
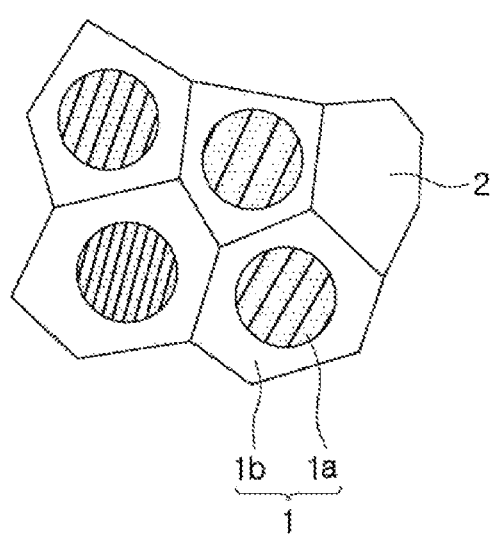
FIG. 3 is a schematic view illustrating a dielectric grain having a core-shell structure according to the related art.

FIG. 3 is a schematic view illustrating a dielectric grain having a core-shell structure according to the related art.

Referring to FIG. 3, a dielectric layer of a multilayer ceramic capacitor according to the related art may include dielectric grains 1 each having a core-shell structure including a core 1a and a shell 1b, and may further include some dielectric grains 2 having a shell-structure including only a shell.

In addition, in the dielectric grain 1 having the core-shell structure including the core 1a and the shell 1, a domain wall of 90° may be present in the core 1a, but may not be present in the shell 1b.

Likewise, in the multilayer ceramic capacitor according to the related art, a domain wall of 90° may not be present in the dielectric grain 2 having the shell-structure.

As described above, in the multilayer ceramic capacitor according to the related art, the domain wall is not present in the shell, and thus, there may be a limitation in implementing a high dielectric constant.

Figure 4:
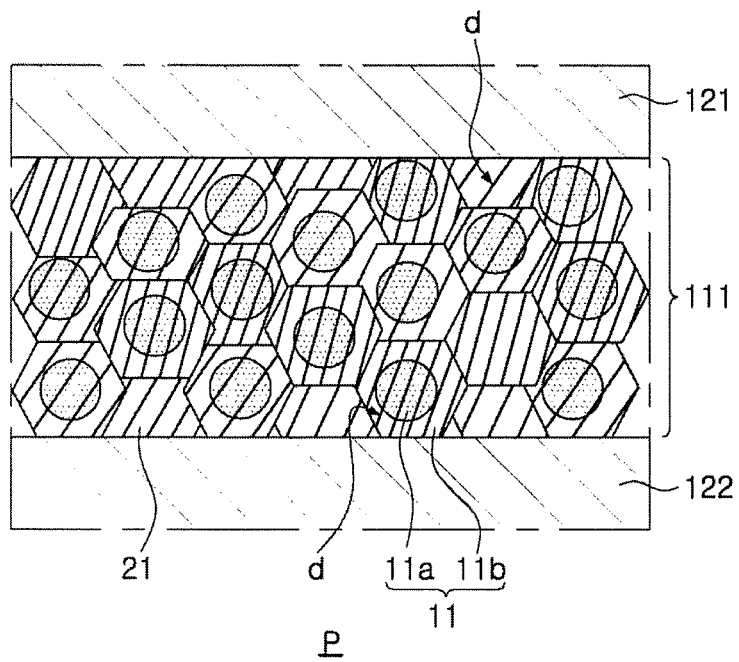
FIG. 4 is an enlarged view of region 'P' of FIG. 2 according to an exemplary embodiment in the present disclosure.

FIG. 4 is an enlarged view of region 'P' of FIG. 2 according to an exemplary embodiment in the present disclosure.

Referring to FIG. 4, the dielectric layer 111 may include dielectric grains 11 each having a core-shell structure including a core 11a and a shell 11b, and a domain wall d may be disposed in the shell 11b.

The dielectric grain 11 may have a perovskite structure represented by ABO$_3$.

Here, A may include one or more selected from the group consisting of barium (Ba), strontium (Sr), lead (Pb), and calcium (Ca), but is not limited thereto.

B is not particularly limited, but may be any material that may be positioned at a B-site in the perovskite structure and may include, for example, one or more selected from the group consisting of titanium (Ti) and zirconium (Zr).

The dielectric grain may include one or more base material main components selected from the group consisting of Ba$_m$TiO$_3$ ($0.995 \leq m \leq 1.010$) (Ba$_{1-x}$Ca$_x$)$_m$(Ti$_{1-y}$Zr$_y$)O$_3$ ($0.995 \leq m \leq 1.010$, and $0 \leq y \leq 0.20$), and Ba$_m$(Ti$_{1-x}$Zr$_x$)O$_3$ ($0.995 \leq m \leq 1.010$ and $x \leq 0.10$) and accessory components, but is not limited thereto.

According to an exemplary embodiment in the present disclosure, the dielectric layer 111 may include a reduction-resistant dielectric composition that may be sintered under a reduction atmosphere. The respective components of the dielectric composition forming the dielectric layer 111 including the dielectric grains 11 will hereinafter be described in more detail.

a) Base Material Powder

The dielectric composition may include base material powder particles represented by $BaTiO_3$.

According to an exemplary embodiment in the present disclosure, the base material powder particles may be represented by $BaTiO_3$, but are not limited thereto. For example, the base material powder particles may be represented by $(Ba_{1-x}Ca_x)(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, are partially solid-dissolved.

That is, the base powder particles may include one or more selected from the group consisting of $BaTiO_3$, $(Ba_{1-x}Ca_x)(Ti_{1-y}Ca_y)O_3$ (here, $0 \leq x \leq 0.3$ and $0 \leq y \leq 0.1$), $(Ba_{1-x}Ca_x)(Ti_{1-y}Zr_y)O_3$ (here, $0 \leq x \leq 0.3$ and $0 \leq y \leq 0.5$) $Ba(Ti_{1-y}Zr_y)O_3$ (here, $0 < y \leq 0.5$), but are not limited thereto.

The base material powder particles may have an average particle size of 40 nm or more to 150 nm or less, but not limited thereto.

b) First Accessory Component

According to an exemplary embodiment in the present disclosure, the dielectric composition may include an oxide or a carbonate including at least one of Mn, V, Cr, Fe, Ni, Co, Cu, and Zn as a first accessory component.

A content of the oxide or the carbonate including at least one of Mn, V, Cr, Fe, Ni, Co, Cu and Zn, which is included as the first accessory component, may be 0.05 to 2.0 mol % based on 100 mol % of the base material powder particles.

The first accessory component may serve to decrease a sintering temperature of a multilayer ceramic capacitor in which the dielectric composition is used and improve high-temperature withstand voltage characteristics of the multilayer ceramic capacitor.

The content of the first accessory component and contents of second to sixth accessory components to be described below may be contents based on 100 mol % of the base material powder particles, and may be defined particularly as mol % of metal ions included in the respective accessory components.

When the content of the first accessory component is less than 0.05 mol %, a sintering temperature may be increased and high-temperature withstand voltage characteristics may be deteriorated to some degree.

When the content of the first accessory component is 2.0 mol % or more, high-temperature withstand voltage characteristics and a room-temperature specific resistance may be deteriorated.

Particularly, the dielectric composition according to an exemplary embodiment in the present disclosure may include the first accessory component having the content of 0.05 to 2.0 mol % based on 100 mol % of the base material powder particles. Therefore, the dielectric composition may be sintered at a low temperature, and the high-temperature withstand voltage characteristics may be obtained.

c) Second Accessory Component

According to an exemplary embodiment in the present disclosure, the dielectric composition may include a second accessory component, which is an oxide or a carbonate including a fixed-valence acceptor element Mg.

The dielectric composition may include the second accessory component which is the oxide or the carbonate including the fixed-valence acceptor element Mg and has a content of 0.0 to 2.0 mol % based on 100 mol % of the base material powder particles.

The second accessory component, which is the fixed-valence acceptor element or compounds including the fixed-valence acceptor element, may adjust a microstructure (suppress abnormal grain growth) and impart reduction resistance in the dielectric composition.

When the content of the second accessory component exceeds 2.0 mol % based on 100 mol % of the base material powder particles, a dielectric constant may be decreased, which is not preferable.

d) Third Accessory Component

According to an exemplary embodiment in the present disclosure, the dielectric composition may include a third accessory component, which is an oxide or a carbonate including at least one of Y, Dy, Ho, Er, Gd, Ce, Nd, Pm, Eu, Tb, Tm, Yb, Lu, and Sm.

The dielectric composition may include the third accessory component which is the oxide or the carbonate including at least one of Y, Dy, Ho, Er, Gd, Ce, Nd, Pm, Eu, Tb, Tm, Yb, Lu, and Sm and has a content of 0.0 to 4.0 mol % based on 100 mol % of the base material powder particles.

The third accessory component may serve to prevent a decrease in reliability of the multilayer ceramic capacitor in which the dielectric composition is used in an exemplary embodiment in the present disclosure.

When the content of the third accessory component exceeds 4.0 mol %, the reliability of the multilayer ceramic capacitor may be decreased, a dielectric constant of the dielectric composition may be decreased, and high-temperature withstand voltage characteristics may be deteriorated.

e) Fourth Accessory Component

According to an exemplary embodiment in the present disclosure, the dielectric composition may include a fourth accessory component, which is an oxide or a carbonate including Ba.

The dielectric composition may include the fourth accessory component which is the oxide or the carbonate including Ba and has a content of 0.0 to 4.15 mol % based on 100 mol % of the base material powder particles.

The content of the fourth accessory component may be based on a content of Ba included in the fourth accessory component without distinguishing an addition form such as an oxide or a carbonate.

The fourth accessory component may serve to promote sintering and adjust a dielectric constant in the dielectric composition, and when the content of the fourth accessory component exceeds 4.15 mol % based on 100 mol % of the base material powder particles, a problem such as a decrease in the dielectric constant or an increase in a sintering temperature may occur.

f) Fifth Accessory Component

According to an exemplary embodiment in the present disclosure, the dielectric composition may include a fifth accessory component including one or more selected from the group consisting of an oxide or a carbonate of one or more of Ca and Zr.

The dielectric composition may include the fifth accessory component which is the oxide or the carbonate including at least one of Ca and Zr and has a content of 0.0 to 20.0 mol % based on 100 mol % of the base material powder particles.

The content of the fifth accessory component may be based on a content of at least one of Ca and Zr included in the fifth accessory component without distinguishing an addition form such as an oxide or a carbonate.

The fifth accessory component may serve to form a core-shell structure in the dielectric composition to increase a dielectric constant and reliability, and when the content of the fifth accessory component is 20.0% or less based on 100 mol % of the base material powder particles, the dielectric composition in which a high dielectric constant is implemented and high-temperature withstand voltage characteristics are good may be provided.

When the content of the fifth accessory component exceeds 20.0 mol % based on 100 mol % of the base material powder particles, a room-temperature dielectric constant may be decreased, and high-temperature withstand voltage characteristics may be deteriorated.

g) Sixth Accessory Component

According to an exemplary embodiment in the present disclosure, the dielectric composition may include an oxide including at least one of Si and Al or a glass compound including Si, as a sixth accessory component.

The dielectric composition may include the sixth accessory component which is the oxide including at least one of Si and Al or the glass compound including Si and has a content of 0.0 to 4.0 mol % based on 100 mol % of the base material powder particles.

The content of the sixth accessory component may be based on a content of at least one of Si and Al included in the sixth accessory component without distinguishing an addition form such as a glass, an oxide, or a carbonate.

The sixth accessory component may serve to decrease a sintering temperature of a multilayer ceramic capacitor in which the dielectric composition is used and improve high-temperature withstand voltage characteristics of the multilayer ceramic capacitor.

When the content of the sixth accessory component exceeds 4.0 mol % based on 100 mol % of the base material powder particles, problems such as deterioration of sinterability and a density, secondary phase formation, and the like, may occur, which is not preferable.

Recently, in accordance with miniaturization and multi-functionalization of electronic products, multilayer ceramic capacitors also tend to be miniaturized and multifunctionalized. Therefore, a multilayer ceramic capacitor having a small size and a large capacitance has been demanded.

As a method of simultaneously accomplishing miniaturization and an increase in capacitance of the multilayer ceramic capacitor, there is a method of increasing the numbers of dielectric layers and electrode layers stacked in the multilayer ceramic capacitor by decreasing thicknesses of the dielectric layers and the electrode layers. Currently, a thickness of the dielectric layer is about 0.6 μm, and technology for decreasing the thickness of the dielectric layer is being continuously developed.

Meanwhile, in order to accomplish the increase in the capacitance of the multilayer ceramic capacitor, a material having a high dielectric constant has been demanded. Atypical material used in the multilayer ceramic capacitor is barium titanate ($BaTiO_3$), but it is difficult to develop a material increasing a dielectric constant due to a limitation of inherent characteristics of the barium titanate.

In addition, a dielectric has a core-shell structure due to additives added to a dielectric material of the multilayer ceramic capacitor in order to improve reliability of the multilayer ceramic capacitor and secure sinterability of the multilayer ceramic capacitor, but the domain wall is not present in a shell, such that there is a limitation in implementing a high dielectric constant.

Generally, barium titanate ($BaTiO_3$) included in a core in a dielectric grain having a core-shell structure is a material having high tetragonality, and since accessory component additives are lightly doped on the barium titanate ($BaTiO_3$) in the core, a domain wall of 90° is present in the core due to inherent high tetragonality of the barium titanate ($BaTiO_3$).

On the other hand, a large amount of accessory component additives are doped on the barium titanate ($BaTiO_3$) in a shell region, such that the barium titanate ($BaTiO_3$) does not have a tetragonal structure, but is in a pseudo cubic state. Therefore, a domain wall disappears in the shell region.

Resultantly, a dielectric constant of the shell region becomes smaller than that of the core, such that it is difficult to secure a high capacitance of the multilayer ceramic capacitor.

Turning to FIG. 4, according to an exemplary embodiment in the present disclosure, the dielectric layer ill may include the dielectric grains 11 each having the core-shell structure including the core 11a and the shell 11b, and the domain wall d may be disposed in the shell 11b, such that a multilayer ceramic capacitor 100 having a high capacitance may be implemented.

That is, unlike a structure of the multilayer ceramic capacitor according to the related art, in the multilayer ceramic capacitor 100 according to an exemplary embodiment in the present disclosure, in the dielectric grain 11 disposed in the dielectric layer 111 and having the core-shell structure, the domain wall d may be disposed in the shell 11b.

In a method of allowing the domain wall d to be disposed in the shell 11b, it may be important to make a lattice structure of the core 11a and the shell 11b uniform.

To this end, when forming the shell while doping additives, which are accessory components, on barium titanate ($BaTiO_3$) during sintering, high thermal energy may be imparted to allow the lattice to be stably formed or some accessory component additives may be doped in advance on the barium titanate ($BaTiO_3$) to dispose the lattice at a stable position, thereby making the lattice uniform.

More detailed contents for this will be described below.

According to an exemplary embodiment in the present disclosure, contents of accessory components based on a content of a base material main component included in the core 11a and the shell 11b may be different from each other.

That is, a content of accessory component additives measured in the core 11a and a content of accessory component additives measured in the shell 11b may be different from each other.

In detail, in the shell 11b, a content of accessory components may be 0.5 mol to 30 mol based on 100 mol of a base material main component.

As described above, in the dielectric grain 11, a region in which the content of the accessory components is measured in a range of 0.5 mol to 30 mol based on 100 mol of the base material main component may be defined as a shell region.

According to an exemplary embodiment in the present disclosure, the region in which the content of the accessory components is measured in the range of 0.5 mol to 30 mol based on 100 mol of the base material main component may be the shell 11b, and the domain wall d may be disposed in the shell 11b.

Next, in the core 11a, a content of accessory components may be 0.1 mol or less based on 100 mol of a base material main component.

As described above, in the dielectric grain 11, a region in which the content of the accessory components is measured in a range of 0.1 mol or less based on 100 mol of the base material main component may be defined as a core region.

According to an exemplary embodiment in the present disclosure, the region in which the content of the accessory components is measured in the range of 0.1 mol or less based on 100 mol of the base material main component may be the core 11a, and in the core 11a, an amount of doped accessory components may be very small, such that the domain wall d may be disposed in the core 11a due to inherent high tetragonality of barium titanate.

As described above, according to an exemplary embodiment in the present disclosure, unlike the structure according to the related art in which the domain wall is not present in the shell, the domain wall d may be disposed in the shell 11b in which the content of the accessory components is measured in the range of 0.5 mol to 30 mol based on 100 mol of the base material main component, such that the multilayer ceramic capacitor 100 having the high capacitance may be implemented.

The accessory components may be the first to sixth accessory components added to the dielectric composition as described above, and a specific example of the accessory components may include rare earth elements such as dysprosium (Dy), holmium (Ho), or yttrium (Y), magnesium (Mg), manganese (Mn), aluminum (Al), or the like.

The shell 11b may have a thickness corresponding to 0.1% to 45% of a diameter of the dielectric grain 11, and a specific absolute numeral value of the thickness may be 1 nm or more to 100 nm or less. However, the thickness of the shell 11b is not necessarily limited thereto.

That is, the shell region in which the content of the accessory components is measured in the range of 0.5 mol to 30 mol based on 100 mol of the base material main component may have the thickness corresponding to 0.1% to 45% of the diameter of the dielectric grain 11.

According to an exemplary embodiment in the present disclosure, the number of domain walls d disposed in the shell 11b may be three or more.

Since the number of domain walls d disposed in the shell 11b is three or more, a distance between the domain walls d may be decreased, such that a high dielectric constant may be implemented in the dielectric grain 11 having the same size.

That is, in order to implement a high dielectric constant in the dielectric grains 11 having the same size, the number of domain walls d disposed in the shell 11b needs to be three or more, and as the number of domain walls d is increased, a distance between the domain walls d may be decreased, such that a high dielectric constant may be secured, but a size of the dielectric grain 11 is limited, such that the number of domain walls d can not but be limited to a predetermined number.

Meanwhile, referring to FIG. 4, in addition to the dielectric grains 11 having the core-shell structure including a core and a shell, some dielectric grains 21 having a shell structure including only a shell may be present.

The dielectric grain 21 having the shell structure may have a structure in which a core is not present, and since the content of the accessory components is measured in the range of 0.5 mol to 30 mol based on 100 mol of the base material main component in the entire region in the dielectric grain 21 having the shell structure, the dielectric grain 21 having the shell structure may be determined to have the structure in which the core is not present.

According to an exemplary embodiment in the present disclosure, the domain walls d may also be disposed in the dielectric grain 21 having the shell structure.

The dielectric grains having the shell structure may also be present in a dielectric layer of the multilayer ceramic capacitor according to the related art. However, even in this case, the domain wall is not present in the dielectric grain having the shell structure.

However, in an exemplary embodiment in the present disclosure, the domain walls d may also be disposed in the dielectric grain 21 having the shell structure, and a high capacitance may thus be secured due to a high dielectric constant.

Figure 5:
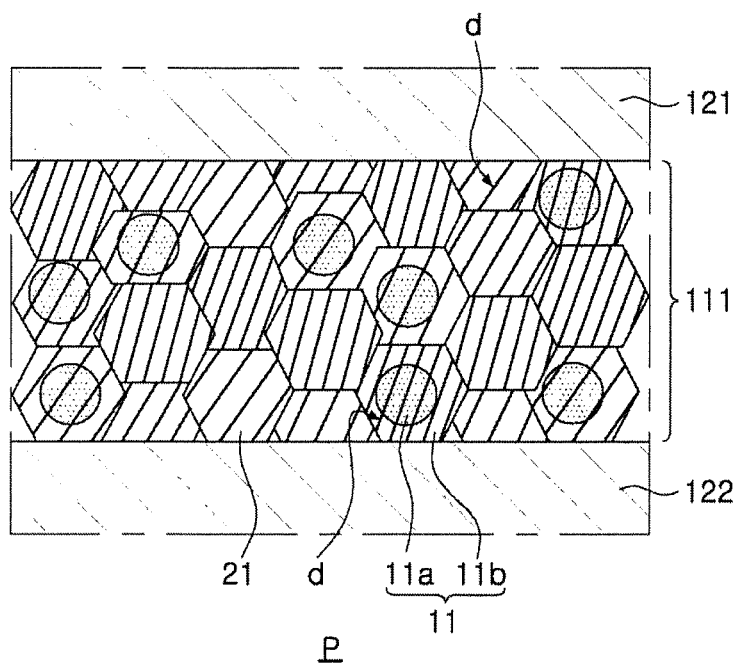
FIG. 5 is an enlarged view of region 'P' of FIG. 2 according to another exemplary embodiment in the present disclosure.

FIG. 5 is an enlarged view of region 'P' of FIG. 2 according to another exemplary embodiment in the present disclosure.

According to another exemplary embodiment in the present disclosure, the dielectric layer 111 may further include dielectric grains 21 having a shell structure including only a shell, and a domain wall d may be disposed in the dielectric grain 21 having the shell structure.

The number of domain walls d disposed in the dielectric grain 21 having the shell structure may be three or more.

The exemplary embodiment in the present disclosure illustrated in FIG. 5 may be different from the exemplary embodiment in the present disclosure described above and illustrated in FIG. 4 in that a fraction of the dielectric grains 21 having the shell structure in the dielectric layer 111 is greater than that in the exemplary embodiment in the present disclosure described above and illustrated in FIG. 4.

That is, according to another exemplary embodiment in the present disclosure, a fraction of the dielectric grains 21 having the shell structure in the dielectric layer 111 may be greater than that in the exemplary embodiment in the present disclosure, and may be greater than that of the dielectric grains 11 having the core-shell structure.

When a ratio of a base material main component, that is, barium titanate powder particles, doped with accessory component additives in advance in a process of manufacturing a dielectric composition is high, the fraction of the dielectric grains 21 in the dielectric layer 111 may be increased.

Features other than the difference described above may be the same as those according to the exemplary embodiment in the present disclosure.

Hereinafter, the present disclosure will be described in more detail through Inventive Examples and Comparative Examples. However, they are to assist in the detailed understanding of the present disclosure, and the scope of the present disclosure is not limited by Inventive Examples.

Inventive Example 1

In Inventive Example, additives such as Si, Mg, Mn, and Dy, a binder, and an organic solvent such as ethanol were added to and wet-mixed with dielectric raw material powder particles including barium titanate ($BaTiO_3$) powder particles to prepare dielectric slurry. Then, the dielectric slurry was applied and dried onto carrier films to form ceramic green sheets, resulting in a dielectric layer.

In this case, additives of all elements were monodispersed and added at a size of 40% or less of a size of the barium titanate powder particles.

The ceramic green sheet may be manufactured by preparing slurry by mixing ceramic powder particles, a binder, and a solvent with one another and manufacturing the slurry in a sheet shape having a thickness of several µm by a doctor blade method.

Next, a conductive paste for an internal electrode including 40 to 50 parts by weight of nickel powder particles having an average particle size of 0.1 µm to 0.2 µm may be prepared.

The conductive paste for an internal electrode was applied to the ceramic green sheets by a screen printing method to form the internal electrodes, the ceramic green sheets on which internal electrode patterns are disposed were stacked to form a laminate, and the laminate was then compressed and cut.

Then, the cut laminate was heated to remove the binder and was sintered under a high temperature reduction atmosphere to form a ceramic body.

In the sintering process, the sintering was performed under a reduction atmosphere (an atmosphere of 0.1% $H_2$/99.9% $N_2$ and $H_2O/H_2/N_2$), and a rapid increase in a temperature was performed in a predetermined region. The sintering was performed at a sintering temperature of 1284° C. for two hours, and re-oxidization was performed at 1000° C. for three hours under a nitrogen ($N_2$) atmosphere to perform heat treatment.

Then, a termination process and an electrode sintering process may be performed on the sintered ceramic body using a copper (Cu) paste to complete external electrodes.

In addition, the dielectric layer 111 and the first and second internal electrodes 121 and 122 in the ceramic body 110 were manufactured to have thicknesses of 0.4 µm or less, after the sintering.

Inventive Example 2

Barium titanate ($BaTiO_3$) powder particles co-doped with Dy and Mg were heat-treated at 1200° C. by hydrothermal synthesis.

Barium titanate ($BaTiO_3$) formed after the heat treatment was wet-milled and dried, and additives such as Si and Mn, a binder, and an organic solvent such as ethanol were added to and wet-mixed with dielectric raw material powder particles including barium titanate ($BaTiO_3$) and the previously manufactured powder particles doped with additives in advance to prepare dielectric slurry. Then, the dielectric slurry was applied and dried onto carrier films to form ceramic green sheets.

Next, a conductive paste for an internal electrode including 40 to 50 parts by weight of nickel powder particles having an average particle size of 0.1 µm to 0.2 µm may be prepared.

The conductive paste for an internal electrode was applied to the ceramic green sheets by a screen printing method to form the internal electrodes, the ceramic green sheets on which internal electrode patterns are disposed were stacked to form a laminate, and the laminate was then compressed and cut.

Then, the cut laminate was heated to remove the binder and was sintered under a high temperature reduction atmosphere to form a ceramic body.

In the sintering process, the sintering was performed under a reduction atmosphere (an atmosphere of 0.1% $H_2$/99.9% $N_2$ and $H_2O/H_2/N_2$), and a rapid increase in a temperature was performed in a predetermined region. The sintering was performed at a sintering temperature of 1192° C. for two hours, and re-oxidization was performed at 1000° C. for three hours under a nitrogen ($N_2$) atmosphere to perform heat treatment.

Inventive Example 3

A multilayer ceramic capacitor was manufactured by the same method as that of Inventive Example 2, but a rapid increase in a temperature was not performed, and sintering was performed at a temperature of 1192° C.

Comparative Example

A multilayer ceramic capacitor was manufactured by the same method as that of Inventive Example 1, but a rapid increase in a temperature was not performed, and sintering was performed at a temperature of 1192° C.

Nominal dielectric constants, dielectric constants, breakdown voltages (BDVs), insulation resistance (IR) defective rates, moisture-proof load defective rates, and the like, were evaluated for Inventive Examples 1 to 3 and Comparative Example, which are proto-type multilayer ceramic capacitor (MLCC) specimens completed as described above.

Dielectric constants of the MLCCs were measured under conditions of 1 kHz and AC 3.0V/µm using an LCR-meter.

The insulation resistances IR were measured after 60 seconds elapse in a state in which DC 10V/µm is applied to ten samples taken in each specimen.

BDVs were measured using a Keithely measurer, and voltage values in a moment in which a current value becomes 10 mA while applying a voltage from 0V by 1.00000V in a sweep manner were measured as BDV values.

The following Table 1 illustrates the electrical characteristics of the proto-type multilayer ceramic capacitor (MLCC) according to Experimental Examples (Inventive Examples and Comparative Example).

TABLE 1

| | Nominal Dielectric Constant | Dielectric Constant @ 3 V/µm | BDV (V) | IR Defective Rate (%) | Moisture-proof Load Defective Rate (%) |
|---|---|---|---|---|---|
| Inventive Example 1 | 8920 | 1980 | 156 | 0 | 0 |
| Inventive Example 2 | 4126 | 2980 | 182 | 0 | 0 |
| Inventive Example 3 | 3806 | 3230 | 206 | 0 | 0 |
| Comparative Example | 5060 | 1820 | 80 | 5 | 4 |

Inventive Examples 1 to 3 may be a case in which the domain wall d is disposed in the shell 11b by making the lattice structure uniform by a method of allowing the lattice to be stably formed by imparting the high thermal energy or disposing the lattice in the stable position by doping some accessory component additives in advance on barium titanate ($BaTiO_3$) when the forming the shell while doping the additives, which are the accessory components, on the barium titanate ($BaTiO_3$) during the sintering, and the Comparative Example, which is a case of manufacturing the multilayer ceramic capacitor by the method according to the related art, may be a case in which the domain wall d is not disposed in the shell.

It may be appreciated from the above Table 1 that dielectric constants and BDVs are higher and IR defective rates and moisture-proof load defective rates are lower in Inventive Examples 1 to 3 than in Comparative Example.

Figure 6:
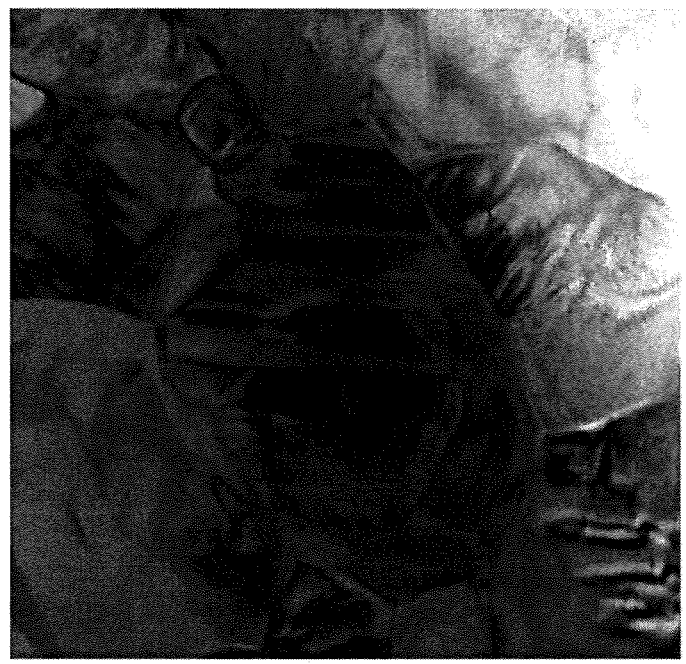
FIG. 6 is a transmission electron microscope (TEM) analysis photograph according to an exemplary embodiment in the present disclosure.

FIG. 6 is a transmission electron microscope (TEM) analysis photograph according to an exemplary embodiment in the present disclosure.

In FIG. 6, a dielectric microstructure of Inventive Example 2 is illustrated. The dielectric microstructure was observed as an image captured by a TEM.

Referring to FIG. 6, it may be appreciated that in the dielectric grain according to an exemplary embodiment in the present disclosure, the domain wall is disposed in the shell as well as in the core.

The domain wall that is actually present may not be viewed depending on an analysis angle at the time of performing TEM analysis. The domain wall may be observed at the time of performing analysis while tilting the dielectric grain at several angles.

According to an exemplary embodiment in the present disclosure, since the domain wall is also disposed in the shell, the dielectric constant may be increased, such that the multilayer ceramic capacitor having the high capacitance may be implemented.

As set forth above, according to an exemplary embodiment in the present disclosure, the dielectric layer in the ceramic body may include the dielectric grains having the core-shell structure, and the domain wall may be disposed in the shell, such that the multilayer ceramic capacitor having the high capacitance may be implemented.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
   a ceramic body including dielectric layers and first and second internal electrodes disposed to face each other with each of the dielectric layers interposed therebetween; and
   first and second external electrodes disposed on external surfaces of the ceramic body and electrically connected to the first and second internal electrode, respectively,
   wherein the dielectric layer includes dielectric grains having a core-shell structure including a core and a shell, and
   a domain wall is disposed in the core and the shell, respectively, and direction of the domain wall in the core is substantially parallel to that of the domain wall in the shell.

2. The multilayer ceramic capacitor of claim 1, wherein each of the dielectric grains includes one or more base material main components selected from the group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, and $0 < y \leq 0.20$), and $Ba_m(Ti_{1-x}Zr_x)O_3$ ($0.995 \leq m \leq 1.010$ and $x \leq 0.10$) and accessory components.

3. The multilayer ceramic capacitor of claim 2, wherein contents of the accessory components based on a content of the one or more base material main components included in the core and the shell are different from each other.

4. The multilayer ceramic capacitor of claim 2, wherein the shell is a region in which a content of the accessory components is 0.5 mol to 30 mol based on 100 mol of the one or more base material main components.

5. The multilayer ceramic capacitor of claim 2, wherein the core is a region in which a content of the accessory components is 0.1 mol or less based on 100 mol of the one or more base material main components.

6. The multilayer ceramic capacitor of claim 2, wherein the one or more base material main components have an average particle size of 40 nm or more to 150 nm or less.

7. The multilayer ceramic capacitor of claim 2, wherein the accessory component comprises an oxide or a carbonate including at least one of the elements selected from the group consisting of Mn, V, Cr, Fe, Ni, Co, Cu, and Zn as a first accessory component.

8. The multilayer ceramic capacitor of claim 2, wherein the accessory component comprises an oxide or a carbonate including Mg as a second accessory component.

9. The multilayer ceramic capacitor of claim 2, wherein the accessory component comprises an oxide or a carbonate including at least one of the elements selected from the group consisting of Y, Dy, Ho, Er, Gd, Ce, Nd, Pm, Eu, Tb, Tm, Yb, Lu, and Sm as a third accessory component.

10. The multilayer ceramic capacitor of claim 2, wherein the accessory component comprises an oxide or a carbonate including Ba as a forth accessory component.

11. The multilayer ceramic capacitor of claim 2, wherein the accessory component comprises an oxide or a carbonate including at least one of the elements selected from the group consisting of Ca and Zr as a fifth accessory component.

12. The multilayer ceramic capacitor of claim 1, wherein a thickness of the dielectric layer is 0.4 µm or less, and a thickness of each of the first and second internal electrodes is 0.4 µm or less.

13. The multilayer ceramic capacitor of claim 1, wherein the shell has a thickness corresponding to 0.1% to 45% of a diameter of each of the dielectric grains.

14. The multilayer ceramic capacitor of claim 1, wherein the shell has a thickness of 1 nm or more to 100 nm or less.

15. The multilayer ceramic capacitor of claim 1, wherein the number of domain walls disposed in the shell is three or more.

16. The multilayer ceramic capacitor of claim 1, wherein the dielectric layer further includes dielectric grains having a shell structure including only a shell, and
   a domain wall is disposed in the dielectric grains having the shell structure.

17. The multilayer ceramic capacitor of claim 16, wherein the number of domain walls disposed in the dielectric grains having the shell structure is three or more.

18. The multilayer ceramic capacitor of claim 1, wherein the core is doped with one or more accessory components.

19. The multilayer ceramic capacitor of claim 1, wherein the core includes tetragonality of barium titanate.

20. The multilayer ceramic capacitor of claim 1, wherein a domain wall of 90° is present in the core.

* * * * *